(12) United States Patent
Andersen et al.

(10) Patent No.: US 10,870,764 B2
(45) Date of Patent: Dec. 22, 2020

(54) ADHESION PROMOTER FOR COATING COMPOSITIONS SUITABLE FOR PRODUCING SURFACER COATS

(71) Applicant: BASF Coatings GmbH, Muenster (DE)

(72) Inventors: Audree Andersen, Havixbeck (DE); Manuela Niemeier, Drensteinfurt (DE); Simone Hesener, Muenster (DE)

(73) Assignee: BASF Coatings GmbH, Muenster (DE)

( * ) Notice: Subject to any disclaimer, the term of this patent is extended or adjusted under 35 U.S.C. 154(b) by 243 days.

(21) Appl. No.: 15/513,599

(22) PCT Filed: Jul. 31, 2015

(86) PCT No.: PCT/EP2015/067666
§ 371 (c)(1),
(2) Date: Mar. 23, 2017

(87) PCT Pub. No.: WO2016/045839
PCT Pub. Date: Mar. 31, 2016

(65) Prior Publication Data
US 2019/0092946 A1 Mar. 28, 2019

(30) Foreign Application Priority Data

Sep. 24, 2014 (EP) ..................... 14186226

(51) Int. Cl.
| | | |
|---|---|---|
| *C09D 5/00* | (2006.01) | |
| *C08G 18/72* | (2006.01) | |
| *C08G 18/75* | (2006.01) | |
| *C08G 18/62* | (2006.01) | |
| *C08G 18/40* | (2006.01) | |
| *C08G 18/42* | (2006.01) | |
| *C09D 175/04* | (2006.01) | |
| *C08G 18/79* | (2006.01) | |
| *C08G 18/80* | (2006.01) | |
| *C08G 18/73* | (2006.01) | |
| *C08G 18/77* | (2006.01) | |
| *C09D 175/06* | (2006.01) | |

(52) U.S. Cl.
CPC ......... *C09D 5/002* (2013.01); *C08G 18/4063* (2013.01); *C08G 18/42* (2013.01); *C08G 18/62* (2013.01); *C08G 18/6216* (2013.01); *C08G 18/722* (2013.01); *C08G 18/73* (2013.01); *C08G 18/755* (2013.01); *C08G 18/771* (2013.01); *C08G 18/792* (2013.01); *C08G 18/809* (2013.01); *C09D 175/04* (2013.01); *C09D 175/06* (2013.01); *C08G 2150/00* (2013.01); *C08G 2150/50* (2013.01)

(58) Field of Classification Search
CPC .... C09D 5/002; C09D 175/06; C09D 175/04; C08G 18/4063; C08G 18/42; C08G 18/6216; C08G 18/73; C08G 18/771; C08G 18/62; C08G 18/722; C08G 18/809; C08G 18/792; C08G 18/755; C08G 2150/00; C08G 2150/50

See application file for complete search history.

(56) References Cited

U.S. PATENT DOCUMENTS

| | | | | |
|---|---|---|---|---|
| 5,292,696 | A | * 3/1994 | Ito | B01D 53/944 502/63 |
| 2004/0138327 | A1 | * 7/2004 | Kohr | C08F 257/02 522/149 |
| 2010/0247785 | A1 | * 9/2010 | Martz | C09D 183/04 427/387 |
| 2013/0196072 | A1 | * 8/2013 | Groenewolt | C08G 18/289 427/407.1 |
| 2013/0227909 | A1 | | 9/2013 | Hutchinson |

(Continued)

FOREIGN PATENT DOCUMENTS

| | | |
|---|---|---|
| JP | 2001-355317 A | 12/2001 |
| JP | 2005-344235 A | 12/2005 |

(Continued)

OTHER PUBLICATIONS

International Preliminary Report on Patentability dated Apr. 6, 2017 in PCT/EP2015/067666 filed Jul. 31, 2015 (with English translation).

(Continued)

*Primary Examiner* — Francisco W Tschen
(74) *Attorney, Agent, or Firm* — Oblon, McClelland, Maier & Neustadt, L.L.P.

(57) ABSTRACT

The present invention relates to a mixture (M) which can be used as curing agent and as adhesion promoter and which comprises at least two components (M1) and (M2), which are different from one another and have in each case independently of one another free and/or blocked isocyanate groups, and which optionally comprises a further component (M3) different from (M1) and (M2); component (M1) comprises at least one aliphatic polyisocyanate, and component (M2) comprises at least one aliphatic polyisocyanate having polyether units, wherein the relative weight ratio of (M1) and (M2) in (M) to one another is in a range from 25:1 to 3:1, based in each case on the solids content of (M1) and (M2), and at least one of the components (M1), (M2), and optionally (M3) present in (M) has hydrolyzable silane groups, to a use of (M) as curing agent and adhesion promoter in a coating composition, to such a coating composition, and to methods for at least partly coating a substrate with a surfacer coat and for at least partly coating a substrate with a multicoat paint system.

20 Claims, No Drawings

(56) References Cited

U.S. PATENT DOCUMENTS

2014/0037851 A1* 2/2014 Groenewolt ....... C08G 18/0823
427/372.2
2014/0065313 A1 3/2014 Groenewolt et al.

FOREIGN PATENT DOCUMENTS

| JP | 2011-1484 A | 1/2011 |
| WO | 01/98393 A1 | 12/2001 |
| WO | 2008/074489 A1 | 6/2008 |

OTHER PUBLICATIONS

International Search Report and Written Opinion of the International Searching Authority dated Sep. 4, 2015 in PCT/EP2015/067666 filed Jul. 31, 2015 (with English translation and English translation of categories of cited documents).
International Search Report dated Sep. 4, 2015 in PCT/EP2015/067666 filed Jul. 31, 2015.
U.S. Appl. No. 15/104,615, filed Jun. 15, 2016, US 2016/0312057 A1, Audree Andersen, et al.
U.S. Appl. No. 15/104,771, filed Jun. 15, 2016, US 2016/0312036 A1, Audree Andersen, et al.
U.S. Appl. No. 15/324,156, filed Jan. 5, 2017, US 2017/0204236 A1, Audree Andersen et al.

* cited by examiner

ADHESION PROMOTER FOR COATING COMPOSITIONS SUITABLE FOR PRODUCING SURFACER COATS

CROSS REFERENCE TO RELATED APPLICATION

This application is a National Stage entry under 35 USC 371 of PCT/EP2015/067666, filed on Jul. 31, 2015, and claims priority to European Patent Application No. 14186226.8, filed on Sep. 24, 2014.

The present invention relates to a mixture (M) which can be used as curing agent and as adhesion promoter and which comprises at least two components (M1) and (M2), which are different from one another and have in each case independently of one another free and/or blocked isocyanate groups, and which optionally comprises a further component (M3) different from (M1) and (M2); (M1) comprises at least one aliphatic polyisocyanate, and (M2) comprises at least one aliphatic polyisocyanate having polyether units, wherein the relative weight ratio of (M1) and (M2) in (M) to one another is in a range from 25:1 to 3:1, based in each case on the solids content of (M1) and (M2), and at least one of the (M1), (M2), and optionally (M3) present in (M) has hydrolyzable silane groups, to a use of (M) as curing agent and adhesion promoter in a coating composition, to such a coating composition, and to methods for at least partly coating a substrate with a surfacer coat and for at least partly coating a substrate with a multicoat paint system.

The finish system on utility vehicles and passenger vehicles is subjected to exacting requirements. A typical system sees a surfacer coat and a topcoat or a basecoat and a clearcoat applied over a metal substrate coated with an electrodeposition. The topcoat here usually unites the functions of a basecoat and a clearcoat with one another. In a resultant paint finish, a major problem continues to be posed by the adhesion between surfacer coat and topcoat and/or between surfacer coat and basecoat, and also by the adhesion between surfacer coat and substrate.

A comparable problem also arises in the context of automotive refinish. In automotive refinish, the painting outcome must be reproduced after an accident, or a finishing error must be remedied. An automotive paint system may be refinished, for example, by first sanding down the damaged site and then applying a primer, a surfacer, a basecoat, and a clearcoat. The paint systems used in this context are different than in automotive OEM finishing. A key reason for this is that automotive refinish must be performed on a fully assembled and equipped automobile. Fully assembled and equipped automobiles, however, can be exposed to temperatures only of 60 up to a maximum of 100° C. Still a problem here is the adhesion between surfacer and basecoat, and also the adhesion between surfacer and primer.

WO 01/98393 A1 discloses a coating composition for coating aluminum substrates in particular. The curing components present in this coating composition may be reaction products of suitable functional isocyanate compounds and suitable functional silanes. A disadvantage of these known coating compositions, however, is that they often display inadequate adhesion to the substrates to be coated, particularly if those substrates carry a primer coat. Reaction products of at least two different, very specific, suitable functional isocyanate compounds and suitable functional silanes are not described in WO 01/98393 A1.

WO 2008/074489 A1 discloses coating compositions which comprise components that have hydrolyzable silane groups. Coating compositions which comprise at least two different, defined components containing isocyanate groups in combination with components having hydrolyzable silane groups are not disclosed in WO 2008/074489 A1.

There is a need for a coating composition which is suitable for producing a surfacer coat on the surface of a primed or unprimed substrate and which, moreover, permits effective adhesion of the surfacer coat to the underlying, primed or unprimed substrate surface and optionally, as well, to at least one further coat that may be situated over it, such as a basecoat.

It is an object of the present invention, therefore, to provide a coating composition for at least partly coating a primed or unprimed substrate with a surfacer coat, said composition having advantages over its prior art counterparts. More particularly it is an object of the present invention to provide such a coating composition with which improved adhesion to the underlying, primed or unprimed substrate surface and optionally, moreover, to at least one further coat optionally situated over it can be achieved.

This object is achieved by the subject matter claimed in the claims and also by the preferred embodiments of said subject matter that are described in the description hereinafter.

The present invention first provides a mixture (M) which can be used as curing agent and as adhesion promoter and which comprises at least two components (M1) and (M2), which are different from one another and have in each case independently of one another free and/or blocked isocyanate groups, and which optionally comprises a further component (M3) different from (M1) and (M2);

component (M1) comprises at least one aliphatic polyisocyanate, and component (M2) comprises at least one aliphatic polyisocyanate having polyether units, wherein the relative weight ratio of components (M1) and (M2) in the mixture (M) to one another is in a range from 25:1 to 3:1, based in each case on the solids content of components (M1) and (M2), and at least one of the components (M1), (M2), and optionally (M3) present in the mixture (M) has hydrolyzable silane groups.

This mixture (M) of the invention is suitable as a curing agent and adhesion promoter in coating compositions which are suitable for at least partly coating a substrate, optionally at least partly coated at least with a primer coat, with a surfacer coat. A further subject of the present invention is therefore a use of this mixture (M) of the invention as curing agent and as adhesion promoter in a coating composition which is suitable for at least partly coating a substrate, optionally coated partly at least with a primer coat, with a surfacer coat.

A further subject of the present invention is a coating composition comprising at least the mixture (M) of the invention which can be used as curing agent and as adhesion promoter, i.e. a mixture (M) which comprises at least two components (M1) and (M2), which are different from one another and have in each case independently of one another free and/or blocked isocyanate groups, and which optionally comprises a further component (M3) different from (M1) and (M2); component (M1) comprises at least one aliphatic polyisocyanate, and component (M2) comprises at least one aliphatic polyisocyanate having polyether units, wherein the relative weight ratio of components (M1) and (M2) in the mixture (M) to one another is in a range from 25:1 to 3:1, based in each case on the solids content of components (M1)

and (M2), and at least one of the components (M1), (M2), and optionally (M3) present in the mixture (M) has hydrolyzable silane groups, at least one polymeric resin (N) which is different from components (M1) and (M2) and also, optionally, (M3) of the mixture (M), and at least one pigment (P), for at least partly coating a substrate, optionally coated at least partly at least with a primer coat, with a surfacer coat.

It has surprisingly been found that through the use of the mixture (M) of the invention and of the coating composition of the invention for producing a surfacer coat on a substrate surface which has optionally been at least partly primed, it is possible to achieve effective adhesion to the underlying substrate surface, which has been optionally at least partly primed, and, moreover, to a further coat optionally situated above it, such as a basecoat, by virtue in particular of the presence of the component (M2), which has polyether units, and of the at least one component having hydrolyzable silane groups in the mixture (M) of the invention and in the coating composition comprising said mixture. Here it has surprisingly emerged that this effective adhesion can still be achieved when the corresponding, optionally at least partly primed substrate coated with the coating composition of the invention and optionally with at least one further coat applied thereto has been subjected to certain exposures, more particularly to different climatic conditions such as weathering, and/or has been stored under such conditions. Even after storage, surprisingly, no significant deterioration in the adhesion properties was observable.

The term "comprising" in the sense of the present invention, as for example in connection with the mixture (M) of the invention and/or with the coating composition of the invention, has in one preferred embodiment the meaning "consisting of". In that case, with regard to the mixture (M) of the invention, there may in this preferred embodiment be not only the components (M1), (M2), and optionally (M3), but also, optionally, at least one further optional component (M4) and/or at least one organic solvent present in the mixture (M) of the invention. All components may each be present in the mixture (M) of the invention in one of their preferred embodiments as specified hereinafter. Furthermore, with regard to the coating composition of the invention, in this preferred embodiment there may be not only components (M), (N), and (P) but also, optionally, at least one further optional component (Q) and/or at least one organic solvent present in the coating composition of the invention. In the coating composition of the invention, all components may each be present in one of their preferred embodiments as specified hereinafter.

The fractions in wt % of the components (M1), (M2), and optionally (M3), present in the mixture (M) of the invention, and of the optionally present at least one further optional component (M4) and/or of the optionally present at least one organic solvent, add up preferably to 100 wt %, based on the total weight of the mixture (M).

The fractions in wt % of the components (M), (N), and (P) present in the coating composition of the invention, and of the optionally present at least one further optional component (Q) and/or of the optionally present at least one organic solvent, add up preferably to 100 wt %, based on the total weight of the coating composition.

Substrate

Suitable substrates used in accordance with the invention include all substrates customarily used and known to the skilled person, but especially metallic substrates. The substrates used in accordance with the invention are preferably selected from the group consisting of steel, preferably steel selected from the group consisting of cold-rolled steel, galvanized steel such as dip-galvanized steel, alloy-galvanized steel (such as Galvalume, Galvannealed or Galfan, for example) and aluminized steel, aluminum and magnesium; especially suitable is galvanized steel such as dip-galvanized steel, for example. The surface of the substrate used may have been at least partly galvanized, such as in the case of Zn/Mg alloys and Zn/Ni alloys, for example. Particularly suitable substrates are parts of vehicle bodies or complete vehicle bodies for automobiles that are to be produced. Before the substrate in question is used, it is preferably cleaned and/or degreased.

Mixture (M) of the Invention

The mixture (M) of the invention may be used as a curing agent and as an adhesion promoter.

Components (M1) and (M2), and also the optionally present component (M3), are in each case different from one another.

Components (M1) and (M2) preferably each have at least free isocyanate groups. Optionally, moreover, it is possible for both (M1) and (M2) to additionally have blocked isocyanate groups. For the at least partial blocking of the isocyanate groups, they are reacted at least partly with a compound suitable for the purpose, and so the blocked polyisocyanate formed is stable at room temperature, i.e., at a temperature of 18 to 23° C., with respect in particular to reactive functional groups such as hydroxyl groups, for example, but reacts with them at elevated temperatures, as for example at ≥80° C., preferably ≥110° C., more preferably ≥130° C., and very preferably ≥140° C. or at 90° C. to 300° C. or at 100 to 250° C., even more preferably at 125 to 250° C., and very preferably at 150 to 250° C.

The relative weight ratio of components (M1) and (M2) to one another in the mixture (M) is preferably in a range from 20:1 to 4:1, more preferably 20:1 to 5:1, based in each case on the solids content of components (M1) and (M2). In another preferred embodiment, the relative weight ratio of components (M1) and (M2) to one another in the mixture (M) is in a range from 15:1 to 5:1, more preferably 15:1 to 4:1, based in each case on the solids content of components (M1) and (M2).

The mixture (M) of the invention mandatorily comprises components (M1) and (M2). Optionally it may further include at least one component (M3). In addition to this, it may comprise, furthermore, at least one organic solvent and/or at least one component (M4) different from (M1), (M2), and (M3). Suitable components (M4) are, in particular, customary additives. Preferably (M4) is selected from the group consisting of antioxidants, antistats, emulsifiers, flow control assistants, solubilizers, defoamers, wetting agents, stabilizers, preferably heat and/or high-temperature stabilizers, process stabilizers, and UV and/or light stabilizers, flame retardants, photoprotectants, deaerating agents, inhibitors such as polymerization inhibitors, catalysts, waxes, wetting and dispersing agents, flexibilizers, reactive diluents, rheological assistants, hydrophobizing agents, hydrophilizing agents, thixotropic agents, impact modifiers, expandants, process auxiliaries, plasticizers, fillers, and mixtures of the abovementioned further additives. The amount of (M4) in the mixture (M) of the invention may vary. The amount, based on the total weight of the mixture (M) of the invention, is preferably 0.01 to 20.0 wt %, more preferably 0.05 to 18.0 wt %, very preferably 0.1 to 16.0 wt %, especially preferably 0.1 to 14.0 wt %, more particularly 0.1 to 12.0 wt %, and most preferably 0.1 to 10.0 wt %, based in each case on the total weight of the mixture (M). In one preferred embodiment, however, the mixture (M) contains no component (M4).

The mixture (M) of the invention is preferably a solvent-based mixture (M). The mixture (M) of the invention therefore comprises preferably, as liquid dilution medium, at least one organic solvent. The term "solvent-based" is intended below to mean preferably that the solvent used is exclusively an organic solvent and no water. The water content of the mixture (M) of the invention is in particular to be not greater than 5 wt %, and especially not greater than 2 wt %, based in each case on the total weight of the mixture (M) of the invention. Examples of organic solvents would include heterocyclic, aliphatic, or aromatic hydrocarbons such as toluene, isophorone, xylene, solvent naphtha, Solvesso 100, Shellsol A, mono- or polyhydric alcohols such as ethylhexanol, butoxypropanol, isopropanol, butyl diglycol, methanol, ethanol, propanol, and butanol, ethers such as diethylene glycol dimethyl ether and dipropylene glycol methyl ether, ethyl glycol and butyl glycol, esters such as ethyl acetate, butyl acetate, pentyl acetate, or ethyl ethoxypropionate, ketones such as cyclohexanone, methyl ethyl ketone (MEK), methyl amyl ketone, methyl isobutyl ketone (MIBK), and acetone, and amides, such as N-methylpyrrolidone, N-ethylpyrrolidone, and dimethylformamide, preferably toluene, xylene, solvent naphtha, Solvesso 100, and Shellsol A. The mixture (M) is preferably a solvent-containing dispersion at least of components (M1) and (M2) and also optionally (M3).

Independently of one another, (M1) and (M2) preferably have a weight-average molecular weight of 1000 to 100 000 g/mol, more preferably of 3000 to 80 000 g/mol, very preferably of 5000 to 60 000 g/mol, more particularly of 7000 to 55 000 g/mol or of 7500 to 50 000 g/mol, more preferably still of 10 000 to 40 000 g/mol, most preferably of 10 000 to 30 000 g/mol. The method for determining the weight-average molecular weight is described below.

Independently of one another, (M1) and (M2) preferably have a number-average molecular weight of 100 to 50 000 g/mol, more preferably of 500 to 40 000 g/mol, very preferably of 1000 to 25 000 g/mol, more particularly of 2000 to 20 000 g/mol, more preferably still of 3000 to 15 000 g/mol, most preferably of 3500 to 10 000 g/mol. The method for determining the number-average molecular weight is described below.

Component (M1)

Component (M1) comprises, preferably is, at least one aliphatic polyisocyanate. Component (M1) preferably comprises at least one aliphatic polyisocyanate which—in contrast to component (M2)—has no polyether units, thereby distinguishing (M1) from (M2) in this respect at least.

Polyisocyanates for the purposes of the present invention are preferably compounds and/or components which comprise on average preferably at least one isocyanate group, more preferably on average at least two and/or at least three isocyanate groups.

Suitability for preparing polyisocyanates which can be used as component (M1) is possessed for example by diisocyanates which contain 2 to 36, more particularly 6 to 15, carbon atoms. Preferred examples are 1,2-ethylene diisocyanate, 1,4-tetramethylene diisocyanate, 1,6-hexamethylene diisocyanate (HDI), 2,2,4(2,4,4)-trimethyl-1,6-hexamethylene diisocyanate (TMDI), 1,3-bis(1-isocyanato-1-methylethyl)benzene, diphenylmethane diisocyanate (MDI), 1,9-diisocyanato-5-methylnonane, 1,8-diisocyanato-2,4-dimethyloctane, 1,12-dodecane diisocyanate, ω,ω'-diisocyanatodipropyl ether, 3-isocyanatomethyl-3,5,5-trimethylcyclohexyl isocyanate (isophorone diisocyanate, IPDI), 1,4-diisocyanatomethyl-2,3,5,6-tetramethylcyclohexane, perhydro-2,4'-diphenylmethane diisocyanate, 2-methyl-1,5-diisocyanatopentane (MPDI), 2-ethyl-1,4-diisocyanatobutane, 1,10-diisocyanatodecane, 1,5-diisocyanatohexane, 1,3-diisocyanatomethylcyclohexane, 1,4-diisocyanatomethylcyclohexane, tetramethylxylyl diisocyanate (TMXDI), and any mixture of these components.

Polyisocyanates suitable as component (M1) are understood for the purposes of this invention to be preferably oligomers and/or polymers of diisocyanates. Basis for such polyisocyanates are the aforementioned diisocyanates or mixtures thereof, preferably hexamethylene diisocyanate (HMDI), isophorone diisocyanate (IPDI), diphenylmethane diisocyanate (MDI) and/or tetramethylxylyl diisocyanate (TMXDI), especially hexamethylene diisocyanate (HMDI) and/or isophorone diisocyanate (IPDI). Methods for the oligomerization or polymerization are known to the skilled person and usually involve the formation of various adducts, more particularly urethanes, allophanates, biuret compounds, uretdiones, and isocyanurates.

Particular preference is given to using isocyanurate trimers of hexamethylene diisocyanate and/or of isophorone diisocyanate and/or oligomers and/or polymers of isophorone diisocyanate and/or hexamethylene diisocyanate as (M1). The skilled person is aware of commercially available products which can be used as component (M1). Examples are the Desmodur® products from Bayer such as Desmodur® XP 2565 and/or Desmodur® N 3600, for example.

Preferably, (M1) has an NCO content in a range from 8 to 25 wt %, more preferably in a range from 10 to 25 wt %, based in each case on the total weight of component (M1). The NCO content is determined by the method described in DIN EN ISO 11909 (date: May 2007).

Component (M2)

Component (M2) comprises, preferably is, at least one aliphatic polyisocyanate having polyether units. As a result of the presence of the polyether units, component (M2) is notable in particular in comparison to component (M1) for a higher hydrophilicity. As a result of the presence of the polyether units, the corresponding polyisocyanates are polyether-modified.

Polyisocyanates which can be used as component (M2) may be prepared using the same aliphatic diisocyanates also used for preparing component (M1). These diisocyanates may be reacted, for example, with monofunctional polyalkylene oxide polyether alcohols, more particularly polyethylene oxide polyether alcohols and/or polypropylene oxide polyether alcohols, in which case the corresponding monofunctional polyalkylene oxide polyether alcohols are preferably employed in a molar excess. The corresponding products which can be used as component (M2) therefore preferably contain at least one urethane group. Alternatively it is possible for at least two aliphatic diisocyanates and/or polyisocyanates to be reacted, with allophanatization, with at least one monofunctional polyalkylene oxide polyether alcohol.

Particular preference is given to using isocyanurate trimers of hexamethylene diisocyanate and/or of isophorone diisocyanate and/or oligomers and/or polymers of isophorone diisocyanate, for preparing component (M2).

Preferably, (M2) has an NCO content in a range from 5 to 30 wt %, more preferably in a range from 10 to 30 wt %, more particularly 10 to 25 wt %, based in each case on the total weight of component (M2). The NCO content is determined by the method described in DIN EN ISO 11909 (date: May 2007).

Preferably at least a fraction of 1 to 60 mol %, more preferably a fraction of 2 to 55 mol %, very preferably a fraction of 5 to 50 mol % of all of the isocyanate groups present in component (M2) is modified with at least one polyether unit such as with an alkoxypolyoxyalkylene group.

Besides free and/or blocked isocyanate groups, component (M2) preferably has at least one alkoxypolyoxyalkylene group such as a methoxypolyoxyalkylene group, more preferably at least one group (I)

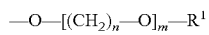   (I)

where
n is 1-4, preferably 2 or 3,
m is 3 to 10, preferably 5 or 6, and
$R^1$ is $C_{1-6}$ alkyl, preferably methyl.

The divalent oxygen atom within group (I) is bonded to the aliphatic polyisocyanate scaffold, preferably via a —(C=O)—N($R^2$)-(A)- unit, in which A is a $C_{1-8}$ alkylene group. Preferably, therefore, with inclusion of the group (I), the resulting structure is

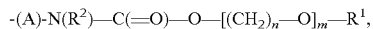

which is bonded via the variable to the aliphatic polyisocyanate scaffold,
in which m, n, and $R^1$ have the above meanings,
A is a $C_{1-8}$ alkylene group, and
$R^2$ is H or —(C=O)—N(H)—($C_{1-8}$ alkylene), where the $C_{1-8}$ alkylene group is bonded to a further aliphatic polyisocyanate scaffold.

Component (M2) preferably comprises at least one aliphatic polyisocyanate having polyether units and selected from the group consisting of

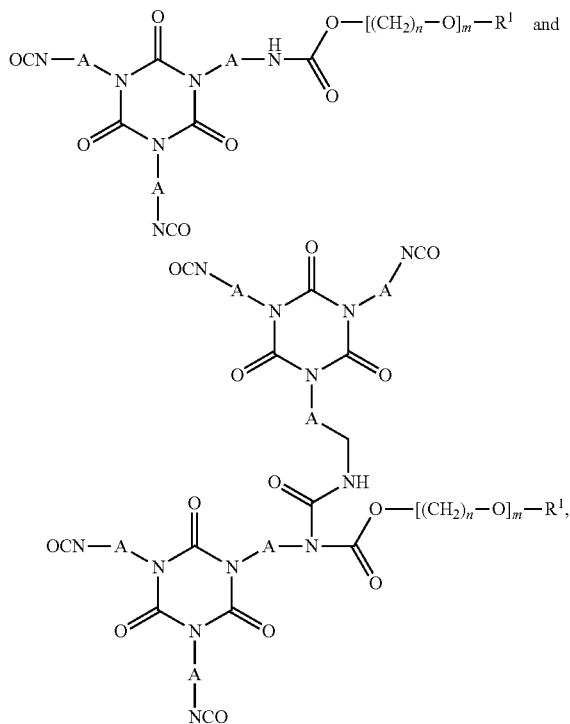

and also mixtures thereof,
in which in each case independently of one another,
A is a $C_{1-8}$ alkylene group,
n is 1-4, preferably 2 or 3,
m is 3 to 10, preferably 5 or 6, and
$R^1$ is $C_{1-6}$ alkyl, preferably methyl.

The skilled person is aware of commercially available products which can be used as component (M2). Examples are the Bayhydur® products from Bayer such as, for example, Bayhydur® 3100, Bayhydur® 401-70, Bayhydur® VP LS 2306, Bayhydur® VP LS 2319, Bayhydur® 304 and/or Bayhydur® 305.

The mixture (M) preferably contains at least 5 wt %, more preferably at least 6 wt %, very preferably at least 7 wt % of component (M2), based on the total solids fraction of the mixture (M).

Component (M3)

At least one of the components (M1), (M2), and optionally (M3) present in the mixture (M) has hydrolyzable silane groups.

Preferably
(i) the components (M1) and (M2) present in the mixture (M) each have hydrolyzable silane groups or
(ii) the components (M1) and (M2) present in the mixture (M) each have no hydrolyzable silane groups, the mixture (M) instead including, in addition to components (M1) and (M2), the at least one further component (M3) which has hydrolyzable silane groups.

In the case of alternative (i), the mixture (M) may optionally further have a component (M3) which (likewise) has hydrolyzable silane groups. Alternative (i) is preferred.

Preferably
(i) the mixture (M) is obtainable by mixing components (M1) and (M2) and partly reacting the isocyanate groups of components (M1) and (M2) with at least one hydrolyzable silane compound which has at least one functional group that is reactive toward isocyanate groups, or
(ii) the mixture (M) is obtainable by mixing components (M1) and (M2) and adding at least one hydrolyzable silane compound as component (M3) to components (M1) and (M2).

In the case of alternative (i), (M) may optionally be prepared additionally using a component (M3) which has hydrolyzable silane groups.

The isocyanate groups of components (M1) and (M2) in the case of (i) are preferably partly reacted with at least one suitable hydrolyzable silane compound, more preferably such that 1 to 60 mol %, more preferably 2 to 50 mol %, very preferably 5 to 40 mol %, especially preferably 5 to 30 mol % or 5 to 20 mol % of all the isocyanate groups present in (M1) and (M2) have been reacted.

Hydrolyzable silane compounds which have at least one functional group that is reactive toward isocyanate groups, and which are used for preparing the mixture (M) in alternative (i) are known to the skilled person. Functional groups reactive toward isocyanate groups are, in particular, OH groups, thiol groups, carboxyl groups, primary and secondary amino groups, and mixtures thereof, preferably carboxyl groups, primary and secondary amino groups, and mixtures thereof, more preferably primary and secondary amino groups.

Examples of hydrolyzable silane compounds which contain at least one primary and/or secondary amino group are 3-aminopropyltrimethoxysilane (APS), 3-aminopropyltriethoxysilane, 3-aminopropyltriisopropoxysilane, 2-aminoethyltrimethoxysilane, 2-amino ethyltriethoxysilane, 2-aminoethyltriisopropoxysilane, aminomethyltrimethoxysilane, aminomethyltriethoxysilane, aminomethyl-triisopropoxysilane, 3-(2-aminoethyl)aminopropyltrimethoxysilane (AEAPS), 3-(2-aminoethyl)aminopropyltriethoxysilane, 3-(2-aminoethyl)aminopropyltriisopropoxysilane, 2-(2-aminoethyl)aminoethyltrimethoxysilane, 2-(2-aminoethyl)-aminoethyltriethoxysilane, 2-(2-aminoethyl)aminoethyltriisopropoxysilane, 3-(3-aminopropyl)aminopropyltrimethoxysilane, 3-(3-aminopropyl)aminopropyltriethoxysilane, 3-(3-aminopropyl)aminopropyltriisopropoxysilane, diethylenetriaminopropyltrimethoxysilane, diethylenetriaminopropyltriethoxysilane, N-(n-butyl)-3-aminopropyltrimethoxysilane, N-(n-butyl)-3-aminopropyltriethoxysilane, N-cyclohexylaminomethyltriethoxysilane, N-cyclohexylaminomethyltrimethoxysilane, N-ethyl-γ-aminoisobutyltrimethoxysilane, N-ethyl-γ-aminoisobutyltriethoxysilane, N-(vinylbenzyl)-2-aminoethyl-3-aminopropyltrimethoxysilane hydrochloride, N-phenyl-γ-aminopropyltrimethoxysilane, N-phenyl-γ-aminopropyltriethoxysilane, γ-ureidopropyltrimethoxysilane, γ-ureidopropyltriethoxysilane, N-methyl[3-(trimethoxysilyl)propyl]carbamate, and/or N-trimethoxysilylmethyl-O-methylcarbamate, and also bis [γ-(triethoxysilyl)propyl]amine and bis[γ-(trimethoxysilyl) propyl]amine. Bis[γ-(triethoxysilyl)propyl]amine and bis[γ-(trimethoxysilyl)propyl]amine are particularly preferred.

Examples of hydrolyzable silane compounds which contain at least one thiol group are 3-mercaptopropyltrimethoxysilane (MPTMS), 3-mercaptopropyltriethoxysilane, 3-mercaptopropyltriisopropoxysilane, 2-mercaptoethyltrimethoxysilane, 2-mercaptoethyltriethoxysilane and/or 2-mercaptoethyltriisopropoxysilane.

In the case of alternative (ii), preferably at least one hydrolyzable silane compound is added as component (M3) to components (M1) and (M2), this component (M3) having no functional group that is reactive toward isocyanate groups particularly under standard conditions of 18-23° C. and 1 bar. However, though, this hydrolyzable silane compound as component (M3) preferably has at least one suitable functional group, more particularly at least one epoxide group. To components (M1) and (M2) it is preferred for at least one suitable hydrolyzable silane compound to be added as component (M3), in an amount in a range from 1 to 15 wt %, more preferably in a range from 2 to 15 wt %, very preferably in a range from 2.5 to 12.5 wt %, based on the total weight of the mixture (M).

Examples of hydrolyzable silane compounds which contain at least one epoxide group are 3-glycidyloxypropyltrimethoxysilane (GLYMO), 3-glycidyloxy-propyltriethoxysilane, 3-glycidyloxypropyltriisopropoxyoxysilane, 2-glycidyloxy-ethyltrimethoxysilane, 2-glycidyloxyethyltriethoxysilane, 2-glycidyloxy-ethyltriisopropoxyoxysilane, 13-(3,4-epoxycyclohexyl)ethyltrimethoxysilane, and/or β-(3,4-epoxycyclohexyl)ethyltriethoxysilane.

The presence of the epoxide group enables the corresponding hydrolyzable silane compound (M3) to be crosslinked with suitable functional groups of the polymeric resin (N) such as OH groups, if the mixture (M) is used as part of a coating composition such as the coating composition of the invention.

Use of the Mixture (M) as Curing Agent and Adhesion Promoter

A further subject of the present invention is a use of the mixture (M) of the invention as curing agent and as adhesion promoter in a coating composition which is suitable for at least partly coating a substrate, optionally coated at least partly at least with a primer coat, with a surfacer coat.

The mixture (M) may be used in particular for improving the adhesion in auto refinish. The term "auto refinish" refers preferably, among other things, to the refinishing which takes place for example in a workshop, for the purpose of repairing existing finishes that have become damaged. Defects in paints may in principle occur even directly after OEM finishing has taken place. In that case the term "OEM refinish" is used. The mixture (M) of the invention can be used in OEM refinish. In both cases the mixture (M) of the invention is also suitable, particularly as part of the coating composition of the invention, for repairing small defects, known as "spots". Such a procedure is also referred to as "spot repair".

All preferred embodiments described above herein in connection with the mixture (M) of the invention are also preferred embodiments in relation to the use of this mixture (M) as curing agent and adhesion promoter in a coating composition which is suitable for at least partly coating a substrate, optionally at least partly coated at least with a primer coat, with a surfacer coat.

Coating Composition of the Invention

The coating composition of the invention is suitable for at least partly coating a substrate, optionally at least partly coated at least with a primer coat, with a surfacer coat. The term "surface" and "surfacer coat" is known to the skilled person and defined in, for example, Römpp Lexikon, Lacke and Druckfarben, Georg Thieme Verlag 1998.

All preferred embodiments described above herein in connection with the mixture (M) of the invention are also preferred embodiments in relation to the use of this mixture (M) as a component in the coating composition of the invention.

The coating composition of the invention is preferably a solvent-based coating composition. The coating composition of the invention therefore comprises preferably, as liquid dilution medium, at least one organic solvent. The term "solvent-based" is intended below to mean preferably that the solvent used is exclusively an organic solvent and no water. The water content of the coating compositions of the invention is in particular to be not greater than 5 wt %, and especially not greater than 2 wt %, based in each case on the total weight of the coating composition of the invention. Examples of organic solvents would include heterocyclic, aliphatic, or aromatic hydrocarbons such as toluene, isophorone, xylene, solvent naphtha, Solvesso 100, Shellsol A, mono- or polyhydric alcohols such as ethylhexanol, butoxypropanol, isopropanol, butyl diglycol, methanol, ethanol, propanol, and butanol, ethers such as diethylene glycol dimethyl ether and dipropylene glycol methyl ether, ethyl glycol and butyl glycol, esters such as ethyl acetate, butyl acetate, pentyl acetate, or ethyl ethoxypropionate, ketones such as cyclohexanone, methyl ethyl ketone (MEK), methyl amyl ketone, methyl isobutyl ketone (MIBK), and acetone, and amides, such as N-methylpyrrolidone, N-ethylpyrrolidone, and dimethylformamide, preferably toluene, xylene, solvent naphtha, Solvesso 100, and Shellsol A.

The coating composition of the invention is preferably in the form of a dispersion or solution, more particularly in the form of a dispersion.

The coating composition of the invention preferably has a solids content, i.e., a nonvolatile fraction, in the range from 5 to 70 wt %, more preferably in the range from 10 to 60 wt %, very preferably in the range from 15 to 50 wt %, especially preferably in the range from 17.5 to 40 wt % or from 20 to 30 wt %, based in each case on the total weight of the coating composition. The skilled person is aware of methods for determining the solids content, i.e., the nonvolatile fractions. The solids content is determined according to the method described hereinafter.

Mixture (M) as Component of the Coating Composition

The coating composition of the invention comprises the mixture (M) of the invention as curing agent and adhesion promoter. The coating composition of the invention preferably comprises the mixture (M), used as curing agent and adhesion promoter, in an amount in a range from 5 to 25 wt %, more preferably in a range from 7.5 to 20 wt %, based on the total weight of the coating composition, and preferably based on the solids of the mixture (M).

Polymeric Resin (N) as Component of the Coating Composition

The coating composition of the invention preferably comprises at least one polymeric resin (N) as a constituent of the binder component.

The term "binder" is understood within the meaning of the present invention, in line with DIN EN ISO 4618 (German version, date: March 2007), to refer preferably to the nonvolatile fractions of a coating composition, such as the coating composition of the invention, that are preferably responsible for film-forming. Pigments present therein, including the pigment (N) and any fillers present, are therefore not subsumed by the term "binder". The nonvolatile fraction may be determined in accordance with the method described hereinafter. More particularly, the term "binder" is understood to refer to the polymeric resins (N) that are responsible for film-forming and are present in the coating composition. The term "binder" also encompasses the mixture (M) present in the coating composition and used as crosslinking agent or curing agent, and also any additives (Q) that may be present and that fall within the definition of a binder.

All customary polymeric resins known to the skilled person are suitable here as polymeric resin (N) of the coating composition of the invention.

The at least one polymeric resin (N) preferably has reactive functional groups which permit a crosslinking reaction. The polymeric resin (N) here is preferably an externally crosslinking polymeric resin. In order to permit a crosslinking reaction, the coating composition of the invention comprises at least the mixture (M), that can be used as curing agent, as well as the at least one polymeric resin (N).

The polymeric resin (N) present in the coating composition of the invention, and/or at least the components (M1) and (M2) present in (M) are preferably crosslinkable thermally. Additionally, however, radiation-curing crosslinking is also possible. These components are preferably crosslinkable on heating to a substrate temperature of or above room temperature, i.e., at a substrate temperature of or above 18-23° C. Preferably these components are crosslinkable only at substrate temperatures ≥40° C., more preferably ≥50° C., very preferably ≥60° C., and especially preferably ≥70° C.

Any customary crosslinkable reactive functional group known to the skilled person and reactive toward isocyanate groups is contemplated as a crosslinkable reactive functional group of the polymeric resin (N). The polymeric resin (N) preferably has at least one kind of functional reactive group selected from the group consisting of primary amino groups, secondary amino groups, hydroxyl groups, thiol groups, carboxyl groups, and epoxide groups, and also mixtures thereof. Preferred are hydroxyl groups and/or carboxyl groups, especially hydroxyl groups.

The at least one polymeric resin (N) is preferably selected from the group consisting of polyurethanes, polyesters, polyamides, polyureas, polystyrenes, polycarbonates, poly (meth)acrylates, vinyl ester-based resins, epoxy resins, and mixtures thereof, with preferably 70 to 100 wt % of the polymeric resin being selected from at least one of the aforementioned polymers. The stated polymers comprehend preferably in each case both homopolymers and corresponding copolymers. The polymeric resin (N) is preferably selected from the group consisting of polyurethanes, polyesters, and poly(meth)acrylates, corresponding copolymers of these polymers, and mixtures thereof, more particularly selected from the group consisting of polyesters, and poly (meth)acrylates, corresponding copolymers of these polymers, and mixtures thereof. Poly(meth)acrylates encompass polyacrylates and polymethacrylates.

The stated polymeric resins preferably further comprise different functional groups for chemical crosslinking, with hydroxyl groups being preferred. Preference is given to using polyester resins and/or poly(meth)acrylate resins which preferably include hydroxyl groups as polymeric resin (N). Organic polymers and resins of these kinds are described in, for example, Rompp-Lexikon Lacke und Druckfarben, Georg Thieme Verlag, Stuttgart, N.Y., 1998, pages 73 to 74. Polyesters produce particularly flexible surfacers. Poly(meth)acrylate resins are preferred because they achieve quicker physical drying and ultimately permit earlier processing. In addition, as mentioned above, it is also possible for epoxy resins to be used. These resins are described in, for example, Rompp-Lexikon Lacke und Druckfarben, Georg Thieme Verlag, Stuttgart, N.Y., 1998, pages 196 to 197.

The coating composition of the invention comprises the at least one polymeric resin (N) preferably in an amount in a range from 5 to 40 wt %, more preferably in a range from 7.5 to 30 wt %, very preferably in a range from 10 to 25 wt %, based in each case on the total weight of the coating composition.

The selection and combination of suitable polymeric resins (N) is made according to the desired and/or required properties of the coating system to be produced. One criterion for selection are the desired and/or required curing conditions, particularly the curing temperatures (crosslinking temperatures). The way in which such a selection must be made is known to a person skilled in the art of coatings technology, who is able to adapt it accordingly. Possibilities here include the conventional one-component and also two-component coating systems (in this regard, see also Rompp-Lexikon Lacke and Druckfarben, Georg Thieme Verlag, Stuttgart, N.Y., 1998, pages 274-276 and pages 641-642).

Pigment (P)

The coating composition of the invention comprises at least one pigment (P) as a further component.

The term "pigment" is known to the skilled person, from DIN 55945 (date: October 2001), for example. A "pigment" within the meaning of the present invention refers preferably to compounds in powder form or platelet form which are insoluble substantially, preferably completely, in the medium surrounding them, such as in the coating composition of the invention, for example. Pigments differ from "fillers" preferably in their refractive index, which for pigments is ≥1.7.

A pigment of this kind is preferably selected from the group consisting of organic and inorganic, color-imparting and extender pigments. Examples of suitable inorganic color-imparting pigments are white pigments such as zinc white, zinc sulfide, or lithopone; black pigments such as carbon black, iron manganese black, or spinel black; chromatic pigments such as chromium oxide, chromium oxide hydrate green, cobalt green or ultramarine green, cobalt blue, ultramarine blue, or manganese blue, ultramarine violet or cobalt violet and manganese violet, red iron oxide, cadmium sulfoselenide, molybdate red or ultramarine red; brown iron oxide, mixed brown, spinel phases and corundum phases, or chromium orange; or yellow iron oxide, nickel titanium yellow, chromium titanium yellow, cadmium sulfide, cadmium zinc sulfide, chromium yellow, or bismuth vanadate. Examples of suitable organic color-imparting pigments are monoazo pigments, disazo pigments, anthraquinone pigments, benzimidazole pigments, quinacridone pigments, quinophthalone pigments, diketopyrrolopyrrole pigments, dioxazine pigments, indanthrone pigments, isoindoline pigments, isoindolinone pigments, azomethine pigments, thioindigo pigments, metal complex pigments, perinone pigments, perylene pigments, phthalocyanine pigments, or aniline black. The pigmentation preferably comprises, in particular, usually titanium dioxide, iron oxide pigment, and carbon black.

The pigment content of pigment (P) in the coating compositions of the invention may vary. The pigment content, based on the total weight of the coating composition of the invention, is preferably in the range from 0.1 to 50 wt %, more preferably in the range from 0.5 to 45 wt %, very preferably in the range from 1.0 to 40 wt %, especially preferably in the range from 2.0 to 35 wt %, and more particularly in the range from 3.0 to 25 wt %.

Optionally Present Further Component (Q)

According to the desired application, the coating composition of the invention may comprise one or more commonly employed components, particularly additives, as component (Q).

This component (Q) is preferably selected from the group consisting of antioxidants, antistats, wetting and dispersing agents, emulsifiers, flow control assistants, solubilizers, defoamers, wetting agents, stabilizers, preferably heat and/or high-temperature stabilizers, process stabilizers, and UV and/or light stabilizers, flame retardants, photoprotectants, deaerators, inhibitors such as polymerization inhibitors, catalysts, waxes, flexibilizers, reactive diluents, rheological assistants, carrier media, hydrophobizing agents, hydrophilizing agents, thickeners, thixotropic agents, impact modifiers, expandants, process auxiliaries, plasticizers, fillers, glass fibers, and reinforcing agents, and mixtures of the aforementioned further additives. The amount of (Q) in the coating composition of the invention may vary. The amount, based on the total weight of the coating composition of the invention, is preferably 0.01 to 20.0 wt %, more preferably 0.05 to 18.0 wt %, very preferably 0.1 to 16.0 wt %, especially preferably 0.1 to 14.0 wt %, more particularly 0.1 to 12.0 wt %, and most preferably 0.1 to 10.0 wt %.

The term "filler" is known to the skilled person, from DIN 55945 (date: October 2001), for example. A "filler" within the meaning of the present invention refers preferably to a substance which is substantially insoluble, preferably completely insoluble, in the coating composition of the invention, and is used more particularly for increasing the volume. "Fillers" within the meaning of the present invention preferably differ from "pigments" in their refractive index, which for fillers is <1.7. Any customary filler known to the skilled person may be used as component (Q). Examples of suitable fillers are kaolin, dolomite, calcite, chalk, calcium sulfate, barium sulfate, graphite, silicates such as magnesium silicates, more particularly corresponding phyllosilicates such as hectorite, bentonite, montmorillonite, talc and/or mica, silicas, especially fumed silicas, hydroxides such as aluminum hydroxide or magnesium hydroxide, or organic fillers such as textile fibers, cellulose fibers, polyethylene fibers, or polymer powders; for further details refer to Rompp Lexikon Lacke and Druckfarben, Georg Thieme Verlag, 1998, pages 250 ff., "Fillers". Normally, in addition, corrosion inhibitors are used, such as silicates, orthophosphates, and polyphosphates, for example. Only for special instances are colored surfacers produced, which support the intended hue for the topcoat system. The surfacers normally have various gray shades, which are produced by fractions of pigmentary carbon blacks and iron oxides (usually yellow iron oxide).

As component (Q), alternatively or additionally, the coating composition of the invention may optionally comprise at least one crosslinking agent (V) which is different from the components, especially (M1) and (M2), that are present in the mixture of the invention. Contemplated in this context is any customary crosslinking agent known to the skilled person. The crosslinking agent (V) is preferably suitable for thermal crosslinking or curing. Examples of suitable crosslinking agents (V) are amino resins, polyamines, phenolic resins, polyfunctional Mannich bases, melamine resins such as, in particular, etherified (alkylated) melamine-formaldehyde condensation products, benzoguanamine resins, resins or compounds containing anhydride groups, resins or compounds containing epoxide groups, tris(alkoxycarbonylamino)triazines, resins or compounds containing carbonate groups, β-hydroxyalkylamides, and compounds having on average at least two groups capable of transesterification, examples being reaction products of malonic diesters and polyisocyanates, or of full and partial polyhydric-alcohol esters of malonic acid with monoisocyanates.

The coating composition of the invention preferably comprises the at least one polymeric resin (N) in an amount in a range from 10 to 35 wt %, based on the total weight of the coating composition, and the at least one pigment (P) in an amount in a range from 5 to 40 wt %, based on the total weight of the coating composition, in particular if the coating composition of the invention comprises the mixture (M), used as curing agent and adhesion promoter, in an amount in a range from 5 to 25 wt %, based on the total weight of the coating composition, the amounts of the components (M), (N), and (P) present in the coating composition, and also, optionally, of at least one further component (Q) present therein, and/or, optionally, of organic solvents present therein, add up in total to 100 wt %.

Method for Producing the Coating Composition of the Invention

A further subject of the present invention is a method for producing the coating composition of the invention. The method of the invention comprises at least the step of mixing the components (M) comprising (M1), (M2), and optionally (M3), (N), and (P), and optionally at least one further component (Q) and/or optionally at least one organic solvent.

In terms of methodology, the production of the coating composition of the invention has no peculiarities, but instead takes place in accordance with the customary and known techniques. The step of mixing in the method of the invention is carried out preferably by means of a high-speed stirrer, stirred tank, or dissolver, such as an in-line dissolver, for example.

Use of the Coating Composition of the Invention

A further subject of the present invention is a use of the coating composition of the invention for at least partly coating a substrate, optionally at least partly coated at least with a primer coat, with a surfacer coat.

All preferred embodiments described above herein in connection with the coating composition of the invention and the mixture (M) of the invention are also preferred embodiments of the coating composition of the invention in relation to the use thereof for at least partly coating a substrate, optionally coated at least partly at least with a priming coat, with a surfacer coat.

Method for at Least Partly Coating a Substrate, Optionally at Least Partly Coated at Least with a Primer Coat, with a Surfacer Coat A further subject of the present invention is a method for at least partly coating a substrate, optionally at least partly coated at least with a primer coat, with a surfacer coat, comprising at least one step (1) of (1) at least partly contacting the substrate with the coating composition of the invention.

All preferred embodiments described above herein in connection with the coating composition of the invention and the mixture (M) of the invention are also preferred embodiments of the coating composition of the invention in relation to the use thereof in the method of the invention for at least partly coating a substrate, optionally coated at least partly at least with a primer coat, with a surfacer coat.

Application of the coating composition of the invention to a substrate, i.e., the contacting as per step (1), may be accomplished by all customary application techniques, such as spraying, knife coating, brushing, pouring, dipping, impregnating, trickling, or rolling, for example, preferably by spray application. At application, the substrate to be coated may itself be at rest, with the application equipment or unit being moved. Alternatively, the substrate to be coated may be moved, with the application unit being at rest relative to the substrate or being moved appropriately. Preference is given to employing spray application techniques, such as, for example, compressed air spraying (pneumatic application), airless spraying, high-speed rotation, electrostatic spray application (ESTA), optionally in conjunction with hot spray application such as hot air spraying, for example.

The coating composition of the invention is applied at the customary and known film thicknesses, as for example in wet film thicknesses from 10 to 400 micrometers, preferably from 80 to 250 micrometers. The resultant dry film thicknesses after curing in this case are then, for example, in the range from 20 to 100 micrometers, in particular from 40 to 80 micrometers.

A further subject of the present invention is a surfacer coat obtainable by the method of the invention.

Method for at Least Partly Coating a Substrate with a Multicoat Paint System

A further subject of the present invention is a method for at least partly coating a substrate with a multicoat paint system, comprising at least the steps of (0) optionally at least partly applying a primer coat to a substrate,
(1) at least partly contacting the substrate optionally at least partly coated at least with a primer coat in step (0) with the coating composition of the invention, for at least partly applying a surfacer coat to the substrate optionally coated at least partly at least with a primer coat,
(2) applying a basecoat film to the surfacer coat applied by step (1), and
(3) applying a clearcoat film to the basecoat film applied by step (2).

All preferred embodiments described above herein in connection with the coating composition of the invention and the mixture (M) of the invention are also preferred embodiments of the coating composition of the invention in relation to the use thereof in the method of the invention for at least partly coating a substrate with a multicoat paint system.

Step (1) of the method corresponds to step (1) of the method of the invention for at least partly coating a substrate, optionally coated at least partly at least with a primer coat, with a surfacer coat.

Step (0) is optional and provides for at least partial application of a primer coat to a substrate. Application of the primer is carried out such that the wet film thickness is in the range of about 25-70 μm, preferably in the range of 35-50 μm. The resulting dry film thicknesses are therefore in the range of 20-100 μm, preferably in the range of 40-80 μm.

The primers used may consist of two-component materials which comprise low-viscosity epoxy resins and polyamine adducts as crosslinkers. Primary and secondary amines react with epoxide groups even at room temperature, producing secondary and tertiary amines, respectively. Aromatic epoxy resins are typically employed. They are prepared preferably from bisphenol A and epichlorohydrin. A corresponding epoxy resin is prepared preferably from the reaction of one equivalent of bisphenol A with two equivalents of epichlorohydrin. Additionally preferred is the use of aromatic epoxy resins of relatively high molecular mass. They are normally prepared by reaction of bisphenol A diglycidyl ether with various amounts of bisphenol A. Amines used may be ethylenediamine, propylenediamine, diethylenetriamine, dipropylenetriamine, isophoronediamine, and bis(4-amino-3-methylcyclohexyl)methane. From polyamines, furthermore, it is also possible to produce oligomeric products which for crosslinking still contain a sufficient number of free amino groups. Such amine adducts consist customarily of an epoxy resin, which is reacted with an excess of polyamines: for example, an adduct of two equivalents of diethylenetriamine and one equivalent of bisphenol A diglycidyl ether. Another group of crosslinkers are low molecular mass polyamides having lateral and terminal free primary or secondary amino groups. The polyamides are prepared by reacting an excess of the above-recited amines with polymeric fatty acids. Suitable solvents are esters, alcohols, and aromatic compounds. The primers employed are preferably chromate-free. As anticorrosion pigments they preferably comprise zinc phosphates. In addition they comprise titanium dioxide and fillers. The primers employed may, moreover, be pigmented with carbon black and/or iron oxides. The primers employed may also consist of one-component materials, which comprise phenolic resins and/or polyvinyl butyral resins and urea-formaldehyde resins, which may have been etherified, as crosslinkers.

Following optional application of the primer coat in step (0) and following application of the surfacer coat in step (1), the primer coat and the surfacer coat are subjected preferably to joint curing. Curing has no peculiarities in terms of methodology, but instead takes place in accordance with the customary and known techniques such as heating in a forced air oven, for example. Curing may take place accordingly, for example, in the region of room temperature (18 to 23° C.) or else at elevated temperatures in the range from, for example, 40° C. to 100° C., preferably from 50° C. to 90° C. Curing may take place, for example, over a period of 5 to 120 minutes, preferably 10 to 40 minutes. Curing may optionally be preceded by a flashing-off or preliminary drying phase, for example at room temperature for a duration of 1 to 60 minutes.

The surfacer coat applied in step (1) typically has a further coat applied over it, more particularly a basecoat, as per step (2) of the method of the invention. The basecoat material is applied in such a way that the wet film thickness is in the range of about 25-70 μm, preferably in the range of 35-50 μm. The resulting dry film thicknesses, accordingly, are in the range of 10-25 μm, preferably in the range of 15-22 μm.

Both solventborne and aqueous basecoat materials may be employed.

The solventborne basecoat materials preferably comprise cellulose acetobutyrate and also polyester and/or polyacrylate and polymethacrylate resins (identified hereinafter as poly(meth)acrylate resins). The polyester and/or poly(meth)acrylate resins preferably further comprise different functional groups for chemical crosslinking, with hydroxyl groups being preferred. Crosslinkers used are aliphatic polyisocyanate adducts of low viscosity, which have already been discussed in connection with the description of the solvent-based surfacer of the invention. Very preferably, use is likewise made here of isocyanurate trimers of hexamethylene diisocyanate. Solvents used can be all those already stated above in connection with the solvent-based surfacer of the invention.

The use of aqueous basecoat materials is preferred. "Aqueous" is a particularization of coating materials, familiar to the skilled person, which comprise as their solvents not organic solvents exclusively, but instead also water as a solvent. "Aqueous" in the context of the present invention means in particular that the basecoat material contains preferably at least 20 wt %, more preferably at least 25 wt %, based in each case on the total amount of the aqueous basecoat material. "Aqueous" should be understood with particular preference to mean that as well as the stated conditions of "at least 20 wt % (or at least 25 wt %) of water, based on the total amount of the aqueous basecoat material", the further proviso is to be met whereby the fraction of organic solvents in the basecoat material is less than 10 wt %, based in each case on the total amount of the aqueous basecoat material. Besides water, furthermore, the aqueous basecoat material may also include organic solvents. Water-miscible organic solvents are employed preferably.

Serving as binders in aqueous basecoat materials are preferably polyurethane resins, polyester resins and/or epoxy resins. Likewise possible is the use of poly(meth)acrylate resins. The stated organic polymers preferably further comprise different functional groups for chemical crosslinking, with hydroxyl groups being preferred. The dispersibility of the organic polymers in water may be achieved via the measures familiar to the skilled person. This may involve ionic modification of the organic polymers through introduction of monomers containing, for example, carboxylate groups or sulfonate groups. Crosslinkers used are preferably polyisocyanates. Preferred polyisocyanates are all those already disclosed in the description of the solvent-based surfacer.

Furthermore, both a solventborne and an aqueous basecoat material comprise at least one customary and known, color-imparting and/or effect-imparting pigment. Examples of such pigments are inorganic-based pigments, such as titanium dioxide, iron oxide, and carbon black, for example, or else customary metal pigments (examples being commercial aluminum bronzes, stainless steel bronzes) and nonmetallic effect pigments (examples being pearlescent pigments and interference pigments). Organic-based color-imparting pigments as well may be employed, such as azo pigments and phthalocyanine pigments. The nature of the pigments and the amount to be employed are selected in a manner familiar to the skilled person, as guided by the requisite or desired properties for the coating material. For further details in this regard, reference may be made to Römpp-Lexikon Lacke and Druckfarben, Georg Thieme Verlag, Stuttgart, N.Y., 1998, page 451.

Prior to the application of the clearcoat material in step (3), the basecoat film is preferably dry. In the context of the present invention, the term "dry" refers preferably to the removal of solvent from the applied material. Depending on the nature of the binder, of course, this drying may already result in the occurrence of crosslinking reactions. Crosslinking, however, is not as yet complete. In other words, the result at this stage is not a fully cured coating film. Drying may take place initially at room temperature (20 to 23° C.) for 5 to 30, preferably 10 to 20 minutes and subsequently at temperatures of 30 to 90° C., more particularly to 50 to 80° C., again for 5 to 30, preferably 10 to 20, minutes.

Step (3) in the method of the invention provides for the application of a clearcoat to the basecoat applied by step (2). A clearcoat material, as is known, is a coating material which, following application and curing, forms a transparent coating (the clearcoat) having protective and/or decorative properties. Protective properties include, for example, scratch resistance and weathering resistance, particularly UV resistance. An example of a decorative quality is a good gloss. The clearcoat materials to be used are those commonly employed in the field of plastics finishing, their selection and use being known to the skilled person (in this regard see also Rompp-Lexikon Lacke and Druckfarben, Georg Thieme Verlag, Stuttgart, N.Y., 1998, page 325). The general techniques for applying the clearcoat are in line with those described earlier on above for the basecoat. The clearcoat is applied in the customary and known film thicknesses, as for example in wet film thicknesses of 10 to 350 micrometers, preferably of 100 to 150 micrometers. The resultant dry film thicknesses after curing are then, for example, in the range from 30 to 70 micrometers, more particularly 40 to 60 micrometers.

Basecoat (applied in step (2)) and clearcoat (applied in step (3)) are preferably cured jointly. There are no methodological peculiarities to this curing, which instead takes place in accordance with the customary and known techniques such as, for example, heating in a forced air oven or irradiation with IR lamps. Also possible is actinic curing by, for example, UV radiation in the case of radiation-curing systems. The curing conditions, especially the curing temperatures, are guided, for example, by the temperature sensitivity of the substrates used or by the choice of binders employed. Accordingly, for example, curing may take place in the region of room temperature (20 to 23° C.) or else at elevated temperatures in the range from, for example, 40° C. to 120° C., preferably from 60° C. to 90° C. The duration of the curing phase as well is selected individually and is dependent on factors including those already specified (for example, choice of binders and/or of curing temperatures). Curing may take place, for example, over a period of 5 to 120 minutes, preferably 10 minutes to 40 minutes. Curing may optionally also be preceded by a flashing-off phase or preliminary drying phase, at room temperature for a duration of 1 to 60 minutes, for example. The specific curing conditions to be employed for which substrates and/or which coating compositions are part of the general knowledge in the art, and so the conditions can be selected and adapted by the skilled person.

A further subject of the present invention is a multicoat paint system obtainable by the method of the invention.

At Least Partly Coated Substrate

A further subject of the present invention is a substrate coated at least partly with the coating composition of the invention, or a substrate coated correspondingly and obtainable by means of one of the methods of the invention. The substrate may optionally be a substrate coated with a primer, i.e. with a priming coat, before the surfacer coat is applied.

Methods of Determination

1. Determination of Nonvolatile Fraction:

The solids content (the nonvolatile fraction) is determined in accordance with DIN EN ISO 3251 (date: Jun. 1, 2008). This involves weighing out 1 g of sample into an aluminum boat which has been dried beforehand, drying it in a drying cabinet at 130° C. for 60 minutes, cooling it in a desiccator, and then reweighing. The residue, relative to the total amount of sample introduced, corresponds to the solids content.

2. Determination of Number-Average and Weight-Average Molecular Weights:

The number-average ($M_n$) and weight-average ($M_w$) molecular weights are determined by gel permeation chromatography (GPC) with tetrahydrofuran as eluent and with use of a polystyrene standard, in a method based on DIN 55672-1 (date: August 2007). The column material used is a styrene-divinylbenzene copolymer. This method can also be used to determine the polydispersity (the ratio of weight-average molecular weight ($M_w$) to number-average molecular weight ($M_n$)).

3. Determination of Adhesion:

The adhesion between a surfacer coat applied to the substrate employed (and obtainable by applying the coating composition of the invention or a comparative coating composition to a substrate optionally coated with a primer coat) and the substrate itself may be determined and evaluated by the method described below.

The adhesion or adhesive strength is determined by means of the cross-cut test in accordance with DIN EN ISO 2409 (date: August 2007). The cross-cut test is carried out either directly after application of the coating in question to the substrate, or after storage of the coated substrate for a time of 16 hours at 40° C. after application of the respective coating, or after storage of the coated substrate under constant humidity conditions in accordance with DIN EN ISO 6270-2 CH (date: September 2005). In the latter case, the coated substrates under investigation are stored for 10 days in the conditioning chamber at 100% humidity and 40° C. Subsequently, in the latter case, the adhesion of the samples under investigation is investigated 1 h, 3 h, or 24 h following removal from the conditioning chamber, using the cross-cut test. The adhesion is evaluated by means of a rating system with ratings 0 to 5, where the rating of 0 is awarded to coatings which have no visible traces after the cross-cut test (very good adhesion) and the rating of 5 to coatings which showed significantly detached regions after the cross-cut test (inadequate adhesion).

The inventive and comparative examples below serve to elucidate the invention, but should not be interpreted as imposing any restriction.

INVENTIVE AND COMPARATIVE EXAMPLES

Unless otherwise indicated, the amounts in parts are parts by weight, and the amounts in percent are percentages by weight in each case.

1. Preparation of Curing Components 1.1 Preparation of a Curing Component (B1a) (Inventive)

The reactants identified in detail in Table 1.1 below are reacted in the proportions reported in that table. First of all, xylene, n-butyl acetate (98-100% strength), 1-methoxy-2-propyl acetate, and ethyl 3-ethoxypropionate are introduced, and are mixed with Desmodur® N3600, Desmodur® XP2565, and Bayhydur® 305. With stirring and heating under reflux, under a nitrogen atmosphere, the amount of Dynasylan® 1124 specified in Table 1.1 is added dropwise at a rate such that a temperature in the range of 50-60° C. is not exceeded. The end of the addition is followed by cooling to 18-23° C.

TABLE 1.1

Preparation of (B1a)

| Item | Ingredient | Amount [g] |
|---|---|---|
| 1 | xylene | 3.26 |
| 2 | n-butyl acetate | 25.75 |
| 3 | 1-methoxy-2-propyl acetate | 2.68 |
| 4 | ethyl 3-ethoxypropionate | 1.06 |
| 5 | Desmodur ® N3600 | 43.17 |
| 6 | Desmodur ® XP2565 | 6.87 |
| 7 | Bayhydur ® 305 | 6.23 |
| 8 | Dynasylan ® 1124 | 8.01 |

The solids content of the resulting curing component (B1a) is 58.4 wt %.

Desmodur® N3600 is an aliphatic polyisocyanate based on trimerized HDI (hexamethylene diisocyanate) from Bayer, having a solids content of 100 wt % and an NCO content of about 23 wt %. Desmodur® XP2565 is an aliphatic polyisocyanate based on IPDI (isophorone diisocyanate) from Bayer, having a solids content of about 80 wt % and an NCO content of about 12 wt %. Bayhydur® 305 is a hydrophilic, aliphatic polyisocyanate containing polyether units and based on HDI (hexamethylene diisocyanate) from Bayer, having a solids content of 100 wt % and an NCO content of about 16.2 wt %. Dynasylan® 1124 is a secondary amine, specifically bis(trimethoxysilylpropyl) amine, from Evonik.

Isocyanate group-containing reactants used in preparing the curing component (B1a) are the commercially available products Desmodur® N3600, Desmodur® XP2565, and Bayhydur® 305. Based on 100 parts by weight of these isocyanate group-containing reactants, then, 76.72 parts by weight of Desmodur® N3600, 12.21 parts by weight of Desmodur® XP2565, and 11.07 parts by weight of Bayhydur® 305 are used, as illustrated in Table 1.2 below:

TABLE 1.2

| Isocyanate group-containing reactants used in preparing B1a | Desmodur ® N3600 | Desmodur ® XP2565 | Bayhydur ® 305 |
|---|---|---|---|
| Parts by weight | 76.72 | 12.21 | 11.07 |

1.2 Preparation of Curing Components (B1b), (B1c), (B1d), (B1e), and (B1f) (inventive)

The inventively employed curing components (B1b), (B1c), (B1d), (B1e), and (B1f) are prepared in analogy to the procedure carried out for the preparation of curing component (B1a), with the difference that, based on 100 parts by weight of the isocyanate groups-containing reactants Desmodur® N3600, Desmodur® XP2565, and Bayhydur® 305, the respective stoichiometry of these reactants to one another that is used, i.e., their parts by weight, is varied as indicated in Table 1.3 below.

TABLE 1.3

| Isocyanate group-containing reactants used in preparing (B1a), (B1b), (B1c), (B1d), (B1e), and (B1f) | Desmodur® N3600 | Desmodur® XP2565 | Bayhydur® 305 |
|---|---|---|---|
| Parts by weight, used in preparing (B1b) | 81.96 | 13.14 | 5.0 |
| Parts by weight, used in preparing (B1c) | 80.66 | 11.84 | 7.5 |
| Parts by weight, used in preparing (B1d) | 79.46 | 10.54 | 10.0 |
| Parts by weight, used in preparing (B1a) (see also Tab. 1.1b) | 76.72 | 12.21 | 11.07 |
| Parts by weight, used in preparing (B1e) | 78.21 | 9.29 | 12.5 |
| Parts by weight, used in preparing (B1f) | 76.96 | 8.04 | 15.0 |

1.3 Preparation of a Comparative Curing Component (V1)

The comparative curing component (V1) is prepared in analogy to the procedure described for (B1a), with the difference that only the commercially available products Desmodur® N3600 and Desmodur® XP2565 are used as isocyanate group-containing reactants.

The comparative curing component (V1) therefore does have silane groups, but was not prepared using the isocyanate group-containing reactant Bayhydur® 305.

1.4 Preparation of curing components (B1d-1), (B1d-2), (B1d-3), and (B1d-4) (inventive)

Curing components (B1d-1), (B1d-2), (B1d-3), and (B1d-4) are prepared in analogy to the procedure described for (B1d), with the difference that (B1 d) is admixed additionally with 2.5 wt % of glycidyloxypropyltrimethoxysilane (GLYMO) (B1d-1), 5.0 wt % of GLYMO (B1d-2), 7.5 wt % of GLYMO (B1d-3), or 10 wt % of GLYMO (B1d-4), with stirring (laboratory stirrer: 260-1820 rpm), based in each case on the total weight of (B1d).

1.5 Preparation of a Comparative Curing Component (V2)

The reactants identified in detail in Table 1.4 below are reacted in the proportions reported in that table. Xylene, n-butyl acetate (98-100% strength), 1-methoxy-2-propyl acetate, and ethyl 3-ethoxypropionate are introduced, and are mixed with Desmodur® N3600, Desmodur® XP2565, and Bayhydur® 305.

TABLE 1.4

Preparation of (V2)

| Item | Ingredient | Amount [g] |
|---|---|---|
| 1 | xylene | 5.03 |
| 2 | n-butyl acetate | 39.71 |
| 3 | 1-methoxy-2-propyl acetate | 4.14 |
| 4 | ethyl 3-ethoxypropionate | 1.64 |
| 5 | Desmodur® N3600 | 43.20 |
| 6 | Desmodur® XP2565 | 6.83 |
| 7 | Bayhydur® 305 | 6.23 |

The solids content of the resulting comparative curing component (V2) is 45.6 wt %.

The comparative curing component (V2) has no silane groups.

1.6 Preparation of Curing Components (B2a), (B2b), (B2c), and (B2d) (Inventive)

Curing components (B2a), (B2b), (B2c), and (B2d) are prepared in analogy to the procedure described for (V2), with the difference that (V2) is admixed additionally with 2.5 wt % of glycidyloxypropyltrimethoxysilane (GLYMO) (B2a), 5.0 wt % of GLYMO (B2b), 7.5 wt % of GLYMO (B2c), or 10 wt % of GLYMO (B2d), with stirring (laboratory stirrer: 260-1820 rpm), based in each case on the total weight of (V2).

2. Production of Inventive Coating Compositions

One each of the inventively employed curing components (B1c), (B1d), (B1e), (B1d-1), (B1d-2), (B1d-3), and (B1d-4), (B2a), (B2b), (B2c), or (B2d), or one of the comparative curing components (V1) or (V2), are used for producing inventive coating compositions or comparative coating compositions, which are suitable in each case for producing a surfacer coat on a substrate.

For the production of each of these coating compositions, a surfacer base varnish component and a diluent component are employed in each case.

The composition of the surfacer base varnish component is reproduced in Table 2.1.

The composition of the diluent component is reproduced in Table 2.2.

To produce the respective coating composition, surfacer base varnish component, diluent component, and in each case an inventively employed curing component or a comparative curing component, V1 or V2, are mixed with one another in a relative weight ratio of 100:13.5:17.5.

TABLE 2.1

| Surfacer base varnish component | |
|---|---|
| Surfacer base varnish component | |
| Polyacrylate | 18.60 |
| Polyester | 2.36 |
| D.E.R. 671 | 2.20 |
| BYK® P 104 | 0.23 |
| Bentone® 34 | 0.50 |
| n-Butyl acetate | 4.00 |
| Methoxypropyl acetate | 7.30 |
| Aerosil® R972 | 1.45 |
| n-Butyl acetate | 1.02 |
| Talc | 8.97 |
| Kaolin | 14.90 |
| Zinc phosphate | 10.50 |
| Titanium dioxide | 9.96 |
| Bayferrox® 306 | 1.20 |
| Barium sulfate | 8.95 |
| Additives | 0.30 |
| Butyl acetate | 1.00 |
| Acrylate | 0.50 |
| n-Butyl acetate | 0.50 |
| Catalyst | 0.99 |
| NC wool (solution) | 2.50 |
| n-Butyl acetate | 0.50 |
| n-Butyl acetate | 0.61 |
| Nacure® 4167 | 1.00 |

The respective amount figures in Table 2.1 are parts by weight.

Employed as "Additives" is a mixture which contains 49.11 parts by weight of xylene, 20.26 parts by weight of ethylhexyl acrylate, 5.06 parts by weight of ethyl acrylate, 0.15 parts by weight of tert-butyl peroxy-2-ethylhexanoate, and 25.42 parts by weight of butyl glycol acetate. Employed as "Catalyst" is a mixture which contains 90 parts by weight of xylene and 10 parts by weight of Tinstab® BL277, a commercially available product from Akcros. D.E.R. 671 is polymeric epoxy resin from Dow Chemicals. BYK® P 104 is a wetting and dispersing agent from Byk. Bentone® 34 is a rheological assistant from Elementis Specialties. Aerosil® R972 is a hydrophobized fumed silica from Evonik. Bayferrox® 306 is a black iron oxide pigment. NC wool is nitrocellulose. Nacure® 4167 is a phosphorus-containing catalyst which is blocked with an amine and sold by King Industries. The polyacrylate used and the polyester used each have functional OH groups.

TABLE 2.2

| Diluent component Diluent component | |
|---|---|
| n-Butyl acetate | 50 |
| Xylene | 15 |
| Solvent naphtha 160/180 | 13 |
| White spirit 135/180 | 10 |
| Methoxypropyl acetate | 6 |
| Butyl glycol acetate | 3 |
| Ethyl 3-ethoxypropionate | 1 |
| Dipentene | 2 |

The respective amount figures in Table 2.2 are parts by weight.

In this way, the following inventive coating compositions and comparative coating compositions are obtained:
F1, containing (B1c),
F2, containing (B1d),
F3, containing (B1e),
F4, containing (B2a),
F5, containing (B2b),
F6, containing (B2c),
F7, containing (B2d),
F8, containing (B1d-1),
F9, containing (B1d-2),
F10, containing (B1d-3),
F11, containing (B1 d-4),
VF1, containing (V1), and
VF2, containing (V2).

3. Production of Coated Substrates Using One of the Inventive or Comparative Coating Compositions Substrates (S) used are steel panels, in each case in the form of test plaques having a size of 10×20×0.45 cm. These substrates are first of all sanded (P180 grit) and then cleaned with a cleaning composition (SV99-0380).

A primer coat, i.e., a priming coat, is applied in a wet film thickness of 35-50 μm by pneumatic spray application to the substrate pretreated as above. The resulting primer coat is subsequently dried at 18-23° C. The primer coat is produced using a primer coating composition which is prepared from a primer base varnish component, a primer diluent component, and a Glasurit component. These components are mixed with one another in a relative weight ratio of 100:8:36.

The compositions of the primer diluent component and of the Glasurit component are reproduced in Tables 3.1 and 3.2, respectively.

TABLE 3.1

| Diluent component | |
|---|---|
| Methoxypropyl acetate | 46.5 |
| Butyl acetate | 30.0 |
| Xylene | 20.0 |
| Butyl glycol acetate | 2.0 |
| Ethyl 3-ethoxypropionate | 1.5 |

TABLE 3.2

| Glasurit component | |
|---|---|
| Ethanol | 27.0 |
| Isopropanol | 56.0 |
| n-Butanol | 13.0 |
| Phosphoric acid (85%) | 4.0 |

The respective amount figures in Tables 3.1 and 3.2 are parts by weight in each case.

The composition of the primer base varnish component is reproduced in Table 3.3. The amount figures in Table 3.3 are parts by weight in each case.

TABLE 3.3

| Primer base varnish component | |
|---|---|
| Mixture 1 | 24.70 |
| Parosin ® PE 45.5 | 6.20 |
| Phenodur ® PR263 | 3.30 |
| Calcium naphthanate (4% strength) | 0.50 |
| Silica | 0.65 |
| Titanium dioxide | 9.40 |
| Talc | 8.00 |
| Zinc phosphate | 5.30 |
| Zinc oxide | 2.00 |
| Bayferrox ® 415 | 3.70 |
| Lamp black | 0.05 |
| n-Butyl acetate | 2.00 |
| n-Butyl acetate | 2.00 |
| Mixture 2 | 10.90 |
| Cellulose (solution) | 3.80 |
| n-Propanol | 9.40 |
| Plastopal ® FIB | 0.50 |
| n-Butanol | 3.5 |

Bayferrox® 415 is a yellow iron oxide pigment. Plastopal® FIB is an isobutanol-etherified urea-formaldehyde resin from BASF. Phenodur® PR263 is a phenolic resin. The silica used is the HDK® T40 product from Wacker. "Mixture 1" used is a mixture of 30 parts by weight n-propanol, 10.3 parts by weight n-butanol, 15.5 parts by weight isobutanol, 30 parts by weight xylene, and 14.2 parts by weight Mowital® B30H, a commercially available polyvinyl butyral resin from Kuraray. "Mixture 2" used is a mixture of 84 parts by weight n-propanol and 16 parts by weight Mowital® B60H, a commercially available polyvinyl butyral resin from Kuraray.

With a wet film thickness of 120-180 μm, one of the inventive coating compositions F1 to F11 or one of the comparative coating compositions FV1 or FV2 is applied as a surfacer coat, by means of pneumatic spray application, to the substrate pretreated and primer-coated as above. The respective surfacer coat thus applied is cured at room temperature (20-23° C.) for 10 minutes and then for a further 25 minutes at 60° C. in a forced air oven (oven temperature).

After the substrates thus coated have been cooled to 20-23° C., they are sanded using an eccentric sander and 400 grit paper, and then cleaned with the SV20-0240 cleaning composition.

Applied subsequently is a standard commercial basecoat, by pneumatic spray application, in a wet film thickness of 35-50 μm. The resulting basecoat is dried at 20-23° C. for a time of 10 to 15 minutes. The basecoat is produced using a basecoat composition which is prepared from a basecoat base varnish component and a standardizer additive component. These components are mixed with one another in a relative weight ratio of 100:50.

Subsequently, a customarily employed, solvent-based clearcoat is applied to each of the resulting substrates coated with a basecoat. To produce the clearcoat, a clearcoat composition is used which is prepared from a clearcoat base varnish component, a diluent component, and a curing component. These components are mixed in a relative weight ratio of 100:8.6:50 to one another.

This is followed by drying of the resulting clearcoat for 10 minutes at 20-23° C. and then for 30 minutes at 60° C. in a forced air oven.

In the respective resulting substrate, the primer coat has a dry film thickness of 15-20 μm, the surfacer coat a dry film thickness of 50-70 μm, the basecoat a dry film thickness of 18-20 μm, and the clearcoat a dry film thickness of about 50 μm.

The following coated substrates are obtained accordingly: S-F1, S-F2, S-F3, S-F4, S-F5, S-F6, S-F7, S-F8, S-F9, S-F10, S-F11, S-VF1, and S-VF2.

A total of 3 samples are produced of each of the different coated substrates, and each sample is investigated as described below in section 4., in each case individually. The respective average is then formed.

4. Investigating the Adhesion Properties of the Coated Substrates 4.1 The adhesion between a surfacer coat, obtainable by applying the inventive coating composition or a comparative coating composition to a substrate coated with a primer coat, and the substrate coated with a primer coat itself is determined and evaluated by means of the method described above.

The results are summarized in Tables 4 and 5:

As can be seen from Tables 4 and 5, a significant improvement in the adhesion to the respective primed substrate (S) can be achieved by using the inventive curing component in the coating composition used for producing a surfacer coat.

TABLE 4

| Coated substrate | Adhesion[1] | Adhesion[2] | Adhesion[3] |
| --- | --- | --- | --- |
| S-VF1 (comparative) | 2 | 5 | 5 |
| S-F1 | 0 | 0 | 0.5 |
| S-F2 | 1 | 0 | 2 |
| S-F3 | 0 | 1.5 | 0.5 |
| S-F8 | 1.5 | 1.5 | 2 |
| S-F9 | 1 | 0.5 | 0.5 |
| S-F10 | 0 | 1 | 1 |
| S-F11 | 0 | 0.5 | 0.5 |

[1]Evaluation of adhesion between surfacer coat and primed substrate by cross-cut testing after storage for a time of 16 hours at 40° C.
[2]Evaluation of adhesion between surfacer coat and primed substrate by cross-cut testing after 1 h after storage for 10 days under constant humidity conditions
[3]Evaluation of adhesion between surfacer coat and primed substrate by cross-cut testing after 3 h after storage for 10 days under constant humidity conditions As can be seen from Table 4, a significant improvement in the adhesion to the respective substrate S can be achieved by using the inventive curing components in the coating composition used for producing a surfacer coat. In F1 to F3, the commercially available product Bayhydur® 305, containing polyether units and subjected to partial silanization, is present. In F8 to F11, with GLYMO, a further compound containing silane groups is additionally present. As shown by a comparison with VF1, the presence of Bayhydur® 305 is necessary in order to achieve sufficient adhesion: the use solely of the commercially available products subjected to partial silanization, Desmodur® XP 2565 and Desmodur® N 3600 (without Bayhydur® 305) is not sufficient to achieve this.

TABLE 5

| Coated substrate | Adhesion[1] | Adhesion[2] |
| --- | --- | --- |
| S-VF2 (comparative) | 2.5 | 3 |
| S-F4 | 1 | 1 |
| S-F6 | 0.5 | 0 |
| S-F7 | 0 | 0 |

[1]Evaluation of adhesion between surfacer coat and primed substrate by cross-cut testing after 1 h after storage for 10 days under constant humidity conditions
[2]Evaluation of adhesion between surfacer coat and primed substrate by cross-cut testing after 24 h after storage for 10 days under constant humidity conditions As can be seen from Table 5, a significant improvement in the adhesion to the respective substrate S can be achieved by using the inventive curing components in the coating composition used for producing a surfacer coat. In F4, F-6, and F7, the commercially available product Bayhydur® 305, containing polyether units, is present in combination with GLYMO as a compound containing silane groups. As shown by a comparison with VF2, the presence of GLYMO is necessary in order to achieve sufficient adhesion: the use of the commercially available products Desmodur® XP 2565 and Desmodur® N 3600 and Bayhydur® 305 alone, without the partial silanization carried out beforehand and/or the addition of a compound containing silane groups, such as GLYMO, is not sufficient to achieve this.

What is claimed is:

1. A mixture (M) comprising at least two components (M1) and (M2), which are different from one another and comprise in each case independently of one another free and/or blocked isocyanate groups, and which mixture optionally comprises a further component (M3) different from (M1) and (M2);
    wherein component (M1) comprises at least one aliphatic polyisocyanate, wherein component (M1) has an NCO content in a range from 8 to 25 wt. % based on total weight of component (M1),
    component (M2) comprises at least one aliphatic polyisocyanate having polyether units, the relative weight ratio of components (M1) and (M2) in the mixture (M) to one another is in a range from 25:1 to 3:1, based in each case on the solids content of components (M1) and (M2), and
    wherein the mixture (M) is obtained by mixing components (M1) and (M2) and optional component (M3) and then partly reacting the isocyanate groups of components (M1) and (M2) with at least one hydrolyzable silane compound which has at least one functional group that is reactive toward isocyanate groups such that 5 to 30 mol % of all the isocyanate groups originally present in components (M1) and (M2) are reacted with the at least one hydrolyzable silane compound, such that each of components (M1) and (M2) contain a hydrolyzable silane group after reaction.

2. The mixture as claimed in claim 1, wherein the relative weight ratio of components (M1) and (M2) in the mixture (M) to one another is in a range from 20:1 to 5:1, based in each case on the solids content of components (M1) and (M2).

3. The mixture as claimed in claim 1, wherein a content of component (M2) in the mixture (M) is at least 5 wt %, based on the total solids content of the mixture (M).

4. The mixture as claimed in claim 1, wherein the mixture (M) is a solvent-containing dispersion at least of components (M1) and (M2) and also optionally (M3).

5. The mixture as claimed in claim 1, further comprising:
at least one polymeric resin (N), different from components (M1) and (M2) and (M3) of the mixture (M), and
at least one pigment (P).

6. The mixture as claimed in claim 5, wherein the mixture comprises components (M1), (M2), and (M3) in an amount in a range from 5 to 25 wt %, based on the total weight of the mixture.

7. The mixture as claimed in claim 5, wherein the polymeric resin (N) is selected from the group consisting of polyurethanes, polyesters, epoxy resins, poly(meth)acrylates, corresponding copolymers of these polymers, and mixtures thereof.

8. The mixture as claimed in claim 5, wherein the mixture
comprises the at least one polymeric resin (N) in an amount in a range from 10 to 35 wt %, based on the total weight of the mixture, and
comprises the at least one pigment (P) in an amount in a range from 5 to 40 wt %, based on the total weight of the mixture.

9. The mixture as claimed in claim 5, wherein the coating composition is suitable for at least partly coating a substrate, optionally coated at least partly at least with a primer coat, with a surfacer coat.

10. The mixture of claim 1, wherein the free and/or blocked isocyanate group is stable at a temperature of from 18 to 23° C.

11. The mixture as claimed in claim 1, Wherein the mixture is suitable as a curing agent and as an adhesion promoter.

12. The mixture as claimed in claim 1, wherein mixture (M) further comprises component (M3), and wherein component (M3) has hydrolyzable silane groups.

13. The mixture as claimed in claim 1, wherein 5 to 20 mol % of all the isocyanate groups originally present in components (M1) and (M2) are reacted with the at least one hydrolyzable silane compound.

14. The mixture as claimed in claim 1, wherein component (M1) comprises an oligomer and/or polymer of a diisocyanate, and is selected from the group consisting of urethanes, allophanates, biurets and isocyanurates.

15. The mixture as claimed in claim 1, wherein component (M2) comprises an oligomer and/or polymer of a diisocyanate, and is selected from the group consisting of urethanes, allophanates, biurets and isocyanurates.

16. A mixture (M) comprising at least two components (M1) and (M2), which are different from one another and comprise in each case independently of one another free and/or blocked isocyanate groups, and which mixture optionally comprises a further component (M3) different from (M1) and (M2);
wherein component (M1) comprises at least one aliphatic polyisocyanate,
component (M2) comprises at least one aliphatic polyisocyanate having polyether units, wherein component (M2) contains no uretdione groups,
the relative weight ratio of components (M1) and (M2) in the mixture (M) to one another is in a range from 25:1 to 3:1, based in each case on the solids content of components (M1) and (M2), and
wherein the mixture (M) is obtained by mixing components (M1) and (M2) and optional component (M3) and then partly reacting the isocyanate groups of components (M1) and (M2) with at least one hydrolyzable silane compound which has at least one functional group that is reactive toward isocyanate groups such that 5 to 30 mol % of all the isocyanate groups originally present in components (M1) and (M2) are reacted with the at least one hydrolyzable silane compound, such that each of components (M1) and (M2) contain a hydrolyzable silane group after reaction.

17. A method for at least partly coating a substrate, optionally at least partly coated at least with a primer coat, with a surfacer coat, the method comprising at least partly contacting the substrate with the mixture as claimed in claim 5.

18. A method for at least partly coating a substrate with a multicoat paint system, the method comprising
optionally at least partly applying a primer coat to a substrate,
at least partly contacting the substrate, optionally at least partly coated at least with the primer coat, with the mixture as claimed in claim 8, thereby at least partly applying a surfacer coat to the substrate optionally coated at least partly at least with the primer coat,
applying a basecoat film to the surfacer coat, and
applying a clearcoat film to the basecoat film.

19. The method of claim 18, wherein an adhesion between the surfacer coat and the substrate is from 0 to 1.5, as measured by cross-cut testing after storage for a time of 16 hours at 40° C.

20. The method of claim 18, wherein an adhesion between the surfacer coat and the substrate is from 0.5 to 2, as measured by cross-cut testing after 3 hours after storage for 10 days under constant humidity conditions.

* * * * *